US005191855A

United States Patent [19]

Conforti

[11] Patent Number: 5,191,855

[45] Date of Patent: Mar. 9, 1993

[54] BATTERY MISSING INDICATOR

[75] Inventor: Fred J. Conforti, Wheaton, Ill.

[73] Assignee: Pittway Corporation, Aurora, Ill.

[21] Appl. No.: 485,221

[22] Filed: Feb. 26, 1990

[51] Int. Cl.[5] .......... G01D 13/00; H01M 2/10

[52] U.S. Cl. .......... 116/280; 116/200; 429/100; 340/636

[58] Field of Search .......... 116/200, 280; 206/333; 429/90, 96, 97, 98, 100; 361/343, 344; 340/568, 636, 628, 629, 630

[56] References Cited

U.S. PATENT DOCUMENTS

| | | | |
|---|---|---|---|
| 4,227,191 | 10/1980 | Raber | 340/628 |
| 4,228,428 | 10/1980 | Niedermeyer | 340/693 |
| 4,525,703 | 6/1985 | Bellino | 340/628 |
| 4,533,904 | 8/1985 | Steinman, Jr. | 116/5 |
| 4,870,395 | 9/1989 | Belano | 248/550 |
| 4,881,063 | 11/1989 | Fawcett | 340/568 |
| 5,055,830 | 10/1991 | Cousins et al. | 116/315 X |

FOREIGN PATENT DOCUMENTS

| | | | |
|---|---|---|---|
| 2836233 | 2/1979 | Fed. Rep. of Germany | 340/629 |

OTHER PUBLICATIONS

Honeywell Publication, published Jun., 1977 Form No. 60-2347-4.

Honeywell Publication, published Sep. 1978, Form No. 60-2465.

*Primary Examiner*—William A. Cuchlinski, Jr.
*Assistant Examiner*—John L. Beres
*Attorney, Agent, or Firm*—Dressler, Goldsmith, Shore, Sutker & Milnamow, Ltd.

[57] ABSTRACT

A battery powered condition detecting unit includes first and second battery retaining prongs which in the absence of a battery come in contact with a blocking flange on a cover thereby making it impossible to latch the cover to the unit. In the presence of a battery, the free ends of the battery retaining prongs are spread apart so that the blocking flange drops therebetween allowing the cover to be latched to the unit.

2 Claims, 4 Drawing Sheets

BATTERY MISSING INDICATOR

FIELD OF THE INVENTION

The invention pertains to structures for visually indicating that a battery is missing from a battery powered electrical unit. More particularly, the invention pertains to visual flags usable with battery powered smoke detectors to indicate the absence of a battery.

BACKGROUND OF THE INVENTION

Smoke detectors are very commonly found today in buildings of all types. Some of these smoke detectors are AC powered. Others are battery powered. Some include a combination of AC power and battery backup power.

Battery powered detectors, while very convenient and easy to install, have suffered from the drawback that a user of the building might not realize the unit needed a battery. As such, because there was no indicia of a missing battery, this condition could persist for a substantial period of time to and including the time when a fire strikes the building. At that point in time, the detector would of course not function and not give out the warning it was intended to provide.

This problem has been dealt with in at least two different ways in the prior art. In a one known prior art detector the battery is located in a drawer which is radially movable with respect to the base.

So long as the battery is positioned in the drawer, the drawer can be freely opened and closed. When the drawer is closed with the battery present, the detector can receive electrical energy from the battery.

When the battery is removed from the drawer, the drawer is locked open and cannot be closed. This provides a visual indication of the missing battery.

While the drawer approach does provide an acceptable solution to the battery indicator problem from a consumer's point of view, from a manufacturer's point of view, it tends to be rather expensive and complicated.

An alternate prior art battery missing indicator has been incorporated into a smoke detector which is intended to be removably affixed to a surface mounted bracket. The bracket might be mounted on the ceiling or the wall of a room.

In this detector, when no battery is installed in the unit, a movable obstruction member extends out of a portion of the base which is intended to be located adjacent the bracket.

The presence of the extending obstruction is intended to make it impossible to couple the detector to the bracket. When a battery is inserted into the base of the detector, the obstructing member is depressed within the base of the detector by the battery. The detector can then be coupled to the bracket.

The above solution is of course not usable with detectors which are directly mountable on a surface without a bracket.

In spite of prior developments, there continues to be a need for cost-effective and reliable battery missing indicators which can be incorporated into electrical units such as battery powered smoke detectors. In addition, there continues to be a need for a simple apparatus of this type which readily conveys, visually, the missing battery indication to anybody passing through or in the area where the detector is mounted.

SUMMARY OF THE INVENTION

A condition sensing detector has a base and a cover. The cover may be separate or hinged to the base.

A condition sensor, such as a smoke detection apparatus, is carried on the base. A battery can be mounted in the base to provide either primary or backup electrical power to the detector. The battery is clamped to the base by at least one, deflectable, battery retaining prong. A second prong can be provided spaced from the one prong to clamp the battery therebetween.

The cover carries a blocking member. This member is rigid and can assume a variety of shapes. One possible shape is generally rectangular. One or more latches can be carried on the base and/or the cover, spaced from the prongs and the blocking member.

The prong or prongs are oriented, with respect to the blocking member, to engage the blocking member in the absence of a battery, as the cover moves toward the base. In this condition, the cover is blocked from latching to the base.

With the battery present, the blocking member does not engage the prongs but passes therebetween and the cover can move against the base. When the cover moves against the base, in the battery present condition, the latch or latches engage and releasably couple the base and cover together.

The latches are always operative to couple the cover to the base whether or not the battery is present in the detector.

In one embodiment, the detector can be an ionization-type smoke detector. The present invention is not however limited thereto.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENTS

Figure 1:
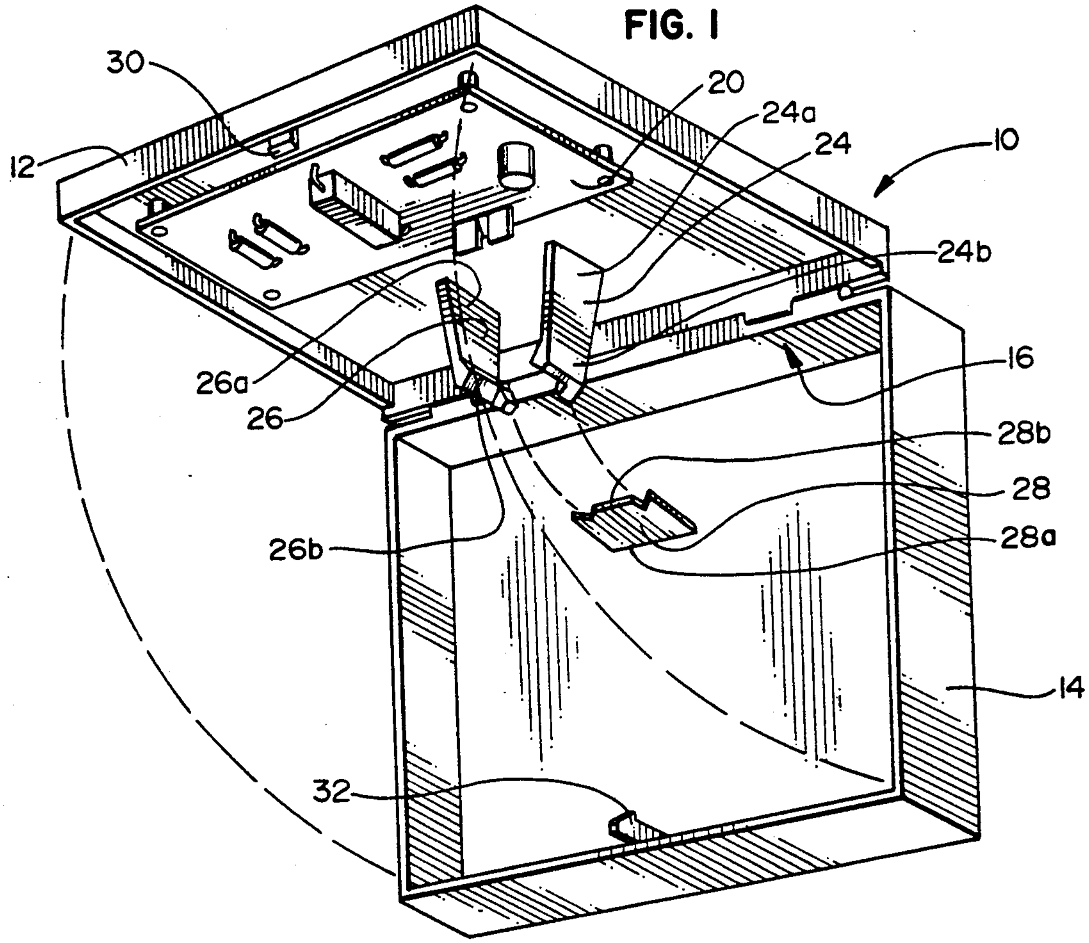
FIG. 1 is a perspective view of a detector unit in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiment illustrated.

FIG. 1 illustrates a detector 10 in accordance with the present invention. The detector 10 includes a base 12 with a cover 14.

The cover 14 is illustrated in FIG. 1 as being attached by hinge 16 to the cover 14. It will be understood that the present invention is not limited to covers which are pivotably or hingedly attached to a base.

In the detector 10 is a sensor unit 20. The unit 20 can be any conventional condition sensing detector.

Carried on the base 12 are first and second battery retaining members 24 and 26. The detector 10 can be exclusively a battery power detector wherein the associated battery would be positioned between the members 24 and 26. Alternately, the detector 10 can be an AC powered unit with battery backup. In such an instance the battery would also be positioned between the members 24 and 26.

Each of the members 24 and 26 is affixed at a first end, respectively 24*a* and 26*a*, to the base 12. Each has a free end respectively, 24*b* and 26*b*. The members 24 and 26 can be formed of a resilient plastic and be integrally molded with the base 12.

Illustrated in FIG. 1 is the relative position of the members 24, 26 with respect to one another in the absence of an energizing battery B. In this condition the free ends 24*b* and 26*b* have moved relatively toward one another. As discussed in more detail subsequently in the presence of the battery B, the members 24*b* and 26*b* move apart from one another.

The cover 14 carries a rigid, generally rectangular, blocking member 28. The member 28 is affixed at a first end 28*a* to the cover 14. The member 28 also has a free edge 28*b* which is displaced from the cover 14. The member 28 can be integrally molded with the cover 14.

The base 12 and cover 14 respectively carry a recess 30 and latch 32. When the pivotably attached cover 14 moves against the base 12, the latch 32 engages in the recess 30. The cover 14 can thus be releasably coupled to the base 12.

Figure 2:
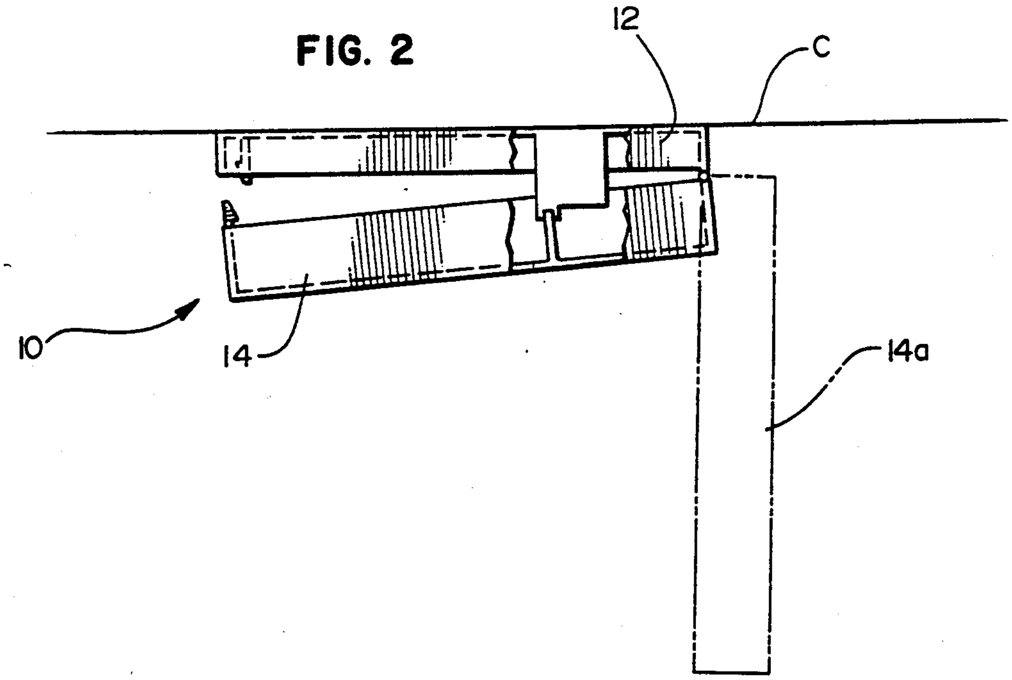
FIG. 2 is a side view, partly broken away, illustrating structural aspects of the present invention.

In normal operation, as illustrated in FIG. 2, the base 12 of the unit 10 is to be attached, as is conventional, to a ceiling C. When so mounted if the cover 14 is not latched to the base 12, it will hang open under the influence of gravity as illustrated in phantom at 14*a*.

Figure 3A:
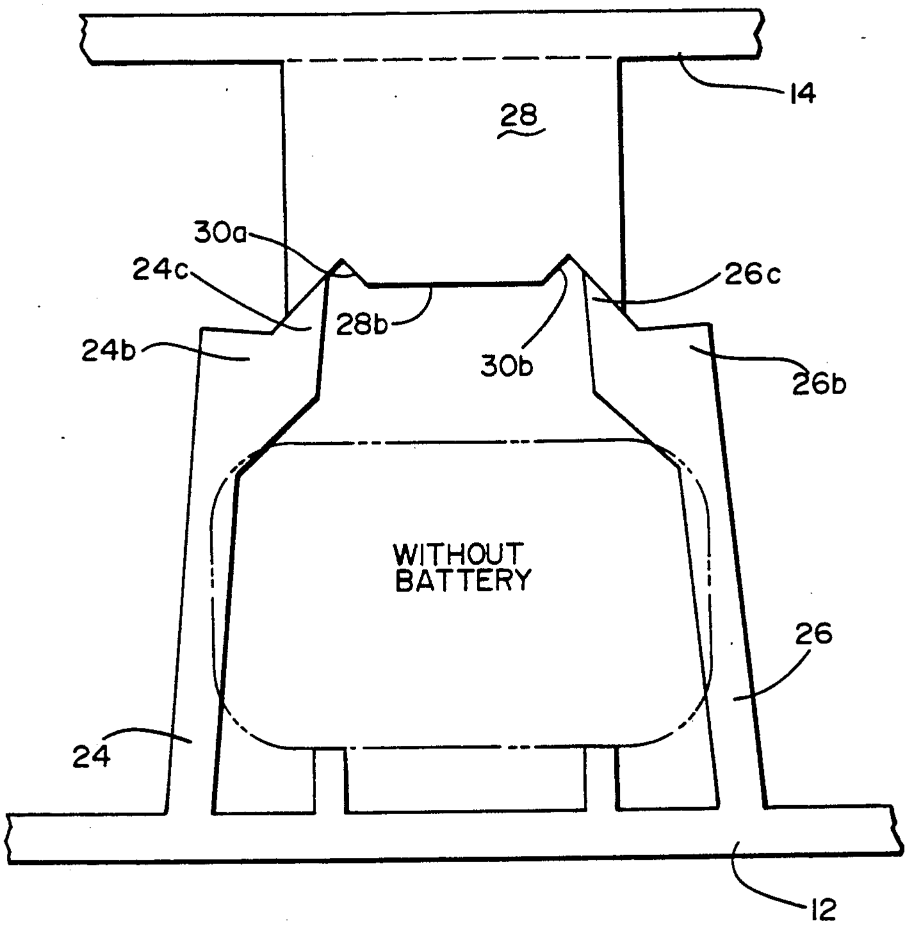
FIGS. 3A and 3B are enlarged, partial, schematic end views of a blocking structure in accordance with the present invention illustrating the missing battery and the battery present conditions respectively.
Figure 3B:
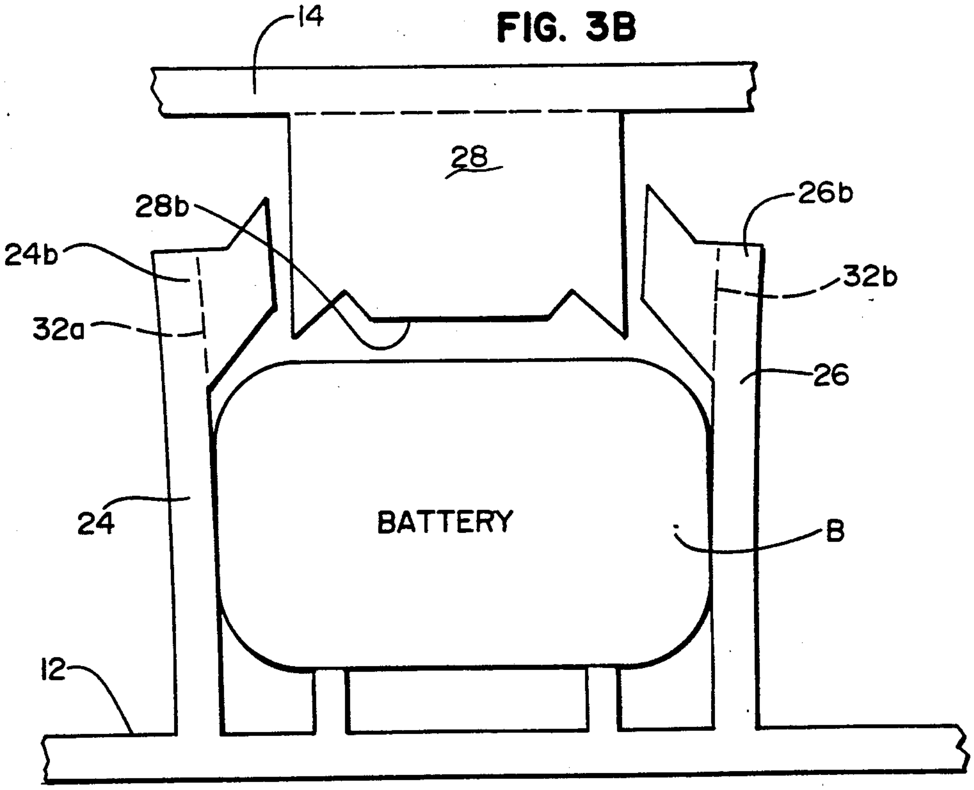

FIGS. 3A and 3B illustrate the relationship of the battery retaining members 24 and 26 with respect to the blocking member 28 in the battery missing and the battery present conditions respectively. In the battery missing condition, as illustrated in FIG. 3A, the free ends 24*b* and 26*b* of the battery retaining members 24 and 26 move inwardly with respect to one another. As the cover 14 moves toward the base 12 the free edge 28*b* of the blocking member 28 comes into contact with and is blocked by surfaces on the free ends 24*b* and 26*b*.

As illustrated in the exemplary embodiment of FIG. 3A the free ends 24*b* and 26*b* carry pointed end areas 24*c* and 26*c*. The end areas blockingly engage V-shaped notches 30*a* and 30*b* in the member 28.

In the missing battery condition as illustrated in FIG. 3A, the interference between the end regions 24*c* and 26*c* with the V-shaped regions 30*a* and 30*b* blocks further movement in the cover 14 toward the base 12. Hence, the latch 32 while operative never engages the latching recess 30. In this condition, as illustrated in FIG. 2 the cover 14 hangs open, illustrated in phantom in FIG. 14*a*, thereby indicating that the battery is missing from the unit 10.

FIG. 3B illustrates the battery present condition wherein the members 24 and 26 have the battery B located therebetween. The free ends 24*b* and 26*b* as a result have moved apart from one another. In this condition, the blocking member 28 passes between free ends 24*b* and 26*b* permitting the cover 14 to move against the base 12 and latch thereto. As illustrated in FIG. 2, with the battery B present, the cover 14 will be closed against and latched to the base 12.

It will be understood that while a particular form of free ends 24*b* and 26*b* and blocking member 28 have been disclosed, other end regions and blocking members with different shapes still come within the spirit and scope of the present invention. For example, the blocking member 28 could have an uninterrupted or straight free edge without any V-shaped notches such as 30*a* and 30*b* therein. The free ends 24*b* and 26*b* could terminate in square ends, indicated in phantom in FIG. 3B by edges 32*a* and 32*b*. Irrespective of the exact shape of the blocking member 28 and the end regions 24*b* and 26*b*, so long as the member 28 comes in blocking contact with the end regions 24*b* and 26*b* in the absence of the battery B, such variations in shape are within the spirit and scope of the present invention.

Figure 4:
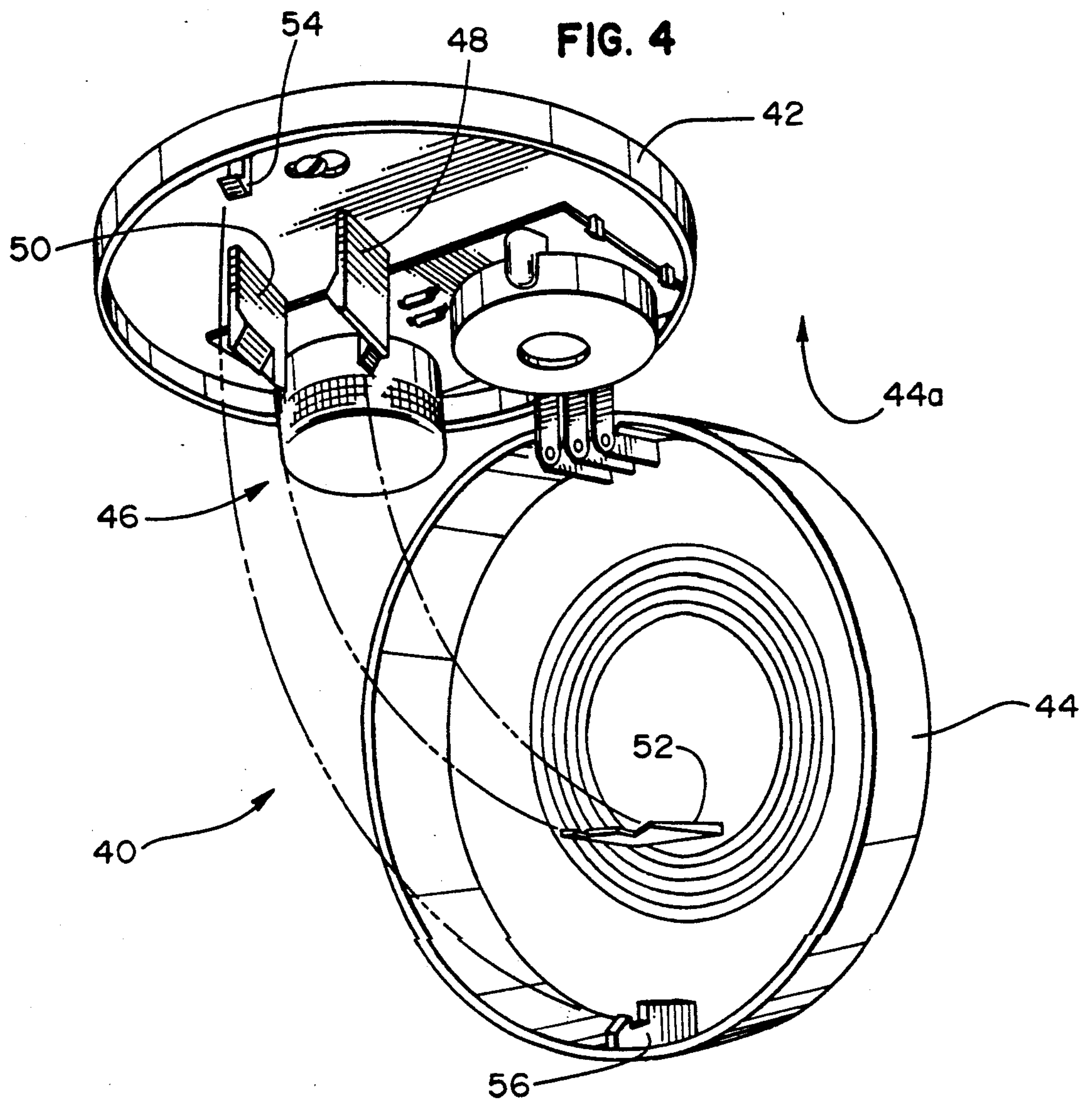
FIG. 4 is a perspective view of an ionization-type smoke detector in accordance with the present invention.

More particularly, FIG. 4 illustrates a smoke detector 40 in accordance with the present invention. The detector 40 has a base 42 and a hingedly mounted cover 44. The base 42 carries a conventional ionization-type detection apparatus generally indicated at 46. Also on the base 42 are first and second battery retaining prongs 48 and 50.

The cover 44 carries a blocking flange 52. The cover 44 can be latched to the base 42 by a latch member 54 carried on the base 42 which releasably engages a latch notch 56 carried on the cover 44.

As the cover 44 rotates toward the base 42, indicated at 44*a*, assuming a battery is present, the blocking flange 52 drops between the battery retaining prongs 48 and 50 allowing the latch 54 to engage the latch retaining recess 56 in the cover 44. In the absence of a battery the blocking flange 52 comes into contact with the free ends of the battery retaining members 48 and 50 and the cover 44 is blocked from closing thereby as illustrated generally in FIG. 3A.

Figure 5:
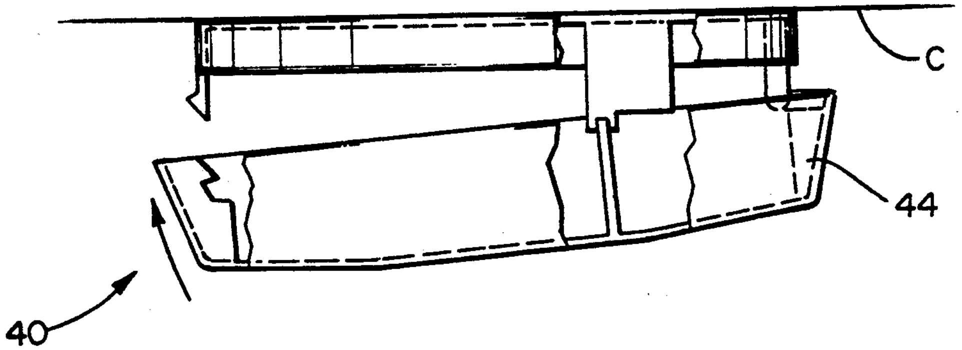
FIG. 5 is a side view, partly broken away, of the detector of FIG. 4 mounted on a ceiling.

FIG. 5 illustrates the detector 40 mounted on a ceiling C as is conventional. In this mounting orientation, the cover 44 will hang open in the absence of a battery providing a visual indication of that absence. With the battery present, the cover 44 can be latched closed against the base 42.

Figure 6A:
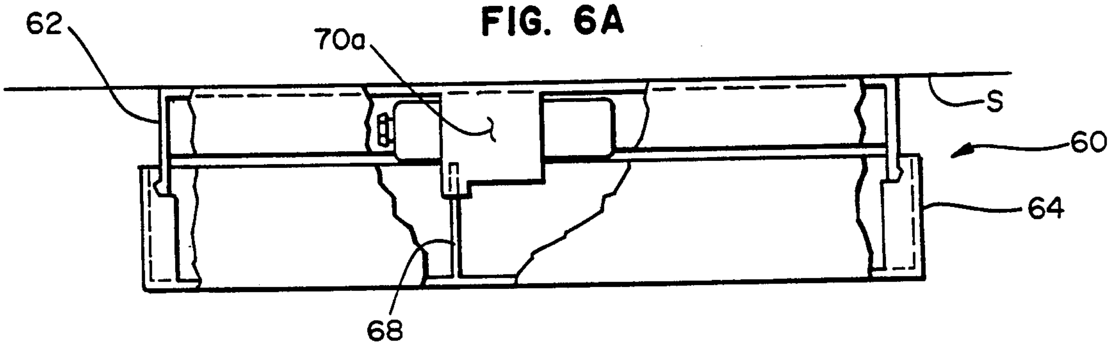
FIGS. 6A, 6B, and 6C illustrate an alternate embodiment of a unit with a removable cover in accordance with the present invention with each view partly broken away.
Figure 6B:
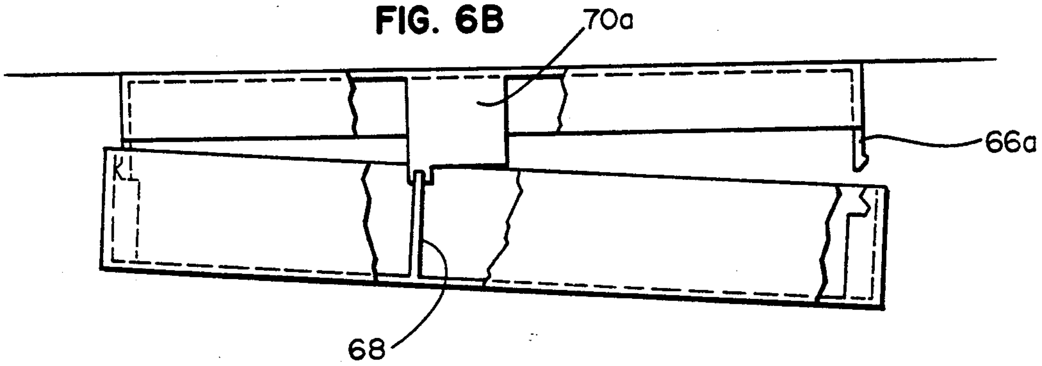
Figure 6C:
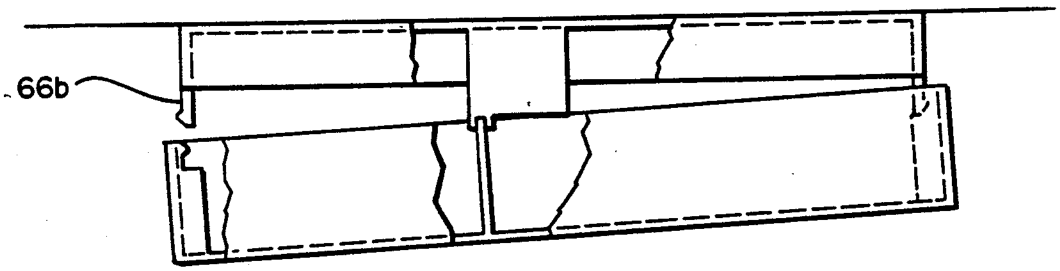

The principles of the present invention can be applied to covers which are not rotatably attached to the respective base of an electrical unit. FIGS. 6A, 6B and 6C illustrate an alternate embodiment 60. The embodiment 60 includes a base 62 which can be affixed to a ceiling or wall surface S.

The unit 60 also includes a cover 64. The cover 64 can be latched to the base 62 in the presence of a battery B as illustrated in FIG. 6A. However, as illustrated in FIGS. 6B and 6C, when the battery B is missing from the base 62 the latch members 66*a* and 66*b* carried thereon cannot simultaneously engage the cover 64. The engagement is blocked by flange 68 which intersects first and second battery prongs 70*a* and 70*b*, of which only 70*a* is illustrated. The prongs 70*a* and 70*b* are the same general type prongs as illustrated previously in FIG. 1 as prongs 24 and 26.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An apparatus for inhibiting latching of a cover to a base of a battery powered unit in the absence of a battery comprising:

a base;

a cover;

first and second spaced apart, substantially identical, deflectable, non-latching, elongated battery retaining members biased toward one another and carried on one of said base or said cover, said members each having a free, battery retaining end wherein said ends are deflectable away from one another in response to the presence of the battery;

a blocking flange carried on the other of said base or said cover, wherein said flange engages at least one of said ends in the absence of the battery thereby inhibiting latching of said cover to said base; and a latch mechanism carried at least in part on one of said base or cover displaced from said members.

2. An apparatus as in claim 1 wherein said blocking flange engages both of said ends.

* * * * *